March 7, 1967    J. B. POWERS    3,307,256
MAGNETIC LID RETAINER FOR CAN OPENER
HAVING LID RELEASE MEANS
Filed Aug. 20, 1965

INVENTOR.
Joseph B. Powers
BY
HIS ATTORNEYS

United States Patent Office 3,307,256
Patented Mar. 7, 1967

3,307,256
MAGNETIC LID RETAINER FOR CAN OPENER
HAVING LID RELEASE MEANS
Joseph B. Powers, 117 E. Grant St.,
New Castle, Pa. 16101
Filed Aug. 20, 1965, Ser. No. 481,237
10 Claims. (Cl. 30—6.4)

This invention relates to a can opening device in the sense of a lid-removing or severing device and particularly, to means for holding and releasing the lid of the can in the sense of a lid manipulating device.

Both can opening devices of the more popular motor-driven type and of the less expensive manually-operated type have employed magnetic means which is customarily moved into holding engagement with the metal lid of the can before the opening or cutting operation starts, and which then holds the lid during the operation and after it is completed.

I have found that the housewife has difficulty in removing or releasing the cut-off lid, since the magnetic holding action continues until the lid is manually released. In other words, I have found that there are a number of disadvantageous features of the present devices, in that they require the housewife to not only grip and remove the open can of the fruit juice or other food product, but also require her to use her other hand to remove the lid from the opener, so that it can be again used. The edge of the lid tends to be sharp and jagged and thus is dangerous to the fingers, since the lid has to be gripped sufficiently to pull it away from the holder and overcome the magnetic holding force. In addition, the operator tends to soil her hands with the liquid or other substance on the inside of the lid. My invention has been devised to eliminate these difficulties and to provide to quick and easy method of release of a severed lid, so that it may be dropped into a garbage container or sink stariner placed thereunder without the necessity of in any way directly touching or gripping it.

It has thus been an object of my invention to devise a solution to the problem of lid manipulation of a can opener;

Another object has been to provide a new and improved type of lid holding or gripping device which will permit the housewife to quickly and easily release a cut-off lid without the necessity of gripping it and pulling it away from the holding means;

These and other objects of my invention will appear to those skilled in the art from the illustrated embodiments.

In the drawings, FIGURE 1 is a fragmental side view in elevation illustrating a can opener provided with a lid manipulating device constructed in accordance with my invention; in this view, a can is shown in position ready for an opening or cutting-off operation upon its lid, with magnetic holding means in a holding position with respect thereto;

Figure 1:
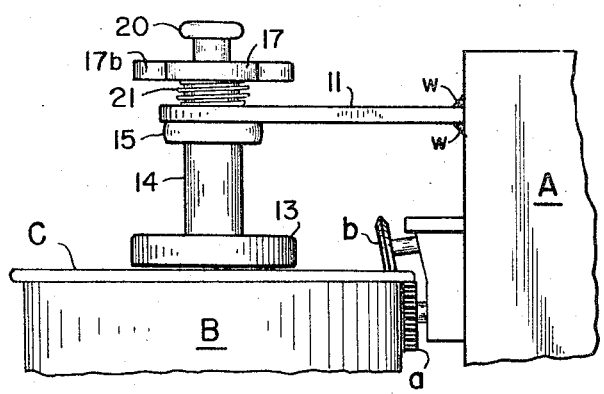

Although for the purpose of illustration, I have shown a magnetic lid lifter, holding or manipulating device as applied to a motor-driven can opener unit, it will be apparent to those skilled in the art that the device can be also employed with a manual type of opener. In carrying out my invention, I provide a lid manipulator provided with a quick release means that is operated to break the magnetic holding action by the employment of a movable stem or plunger, and in such a manner that the operation is remotely controlled without the necessity of directly gripping the lid with the fingers. In the drawings, A represents the housing of a conventional motor-driven can-opening unit. B represents a food, drink or other typical can having its contents sealed-off by a lid C. In such cans, it is customary to permanently secure the lid C over the top or bottom of the can B, which lid, of course, is of magnetic material, for example, of a ferrous metal content so that it is subject to magnetic attraction. In FIGURE 1, I have somewhat diagrammatically shown a motor-driven, rim-engaging, can-rotating, knurled, drive wheel $a$ which is driven from a shaft of the motor unit. An above-positioned cutting wheel $b$ is rotatably mounted above the drive wheel $a$ to engage with and sever the lid C about its securing bead while the can B is being rotated by the wheel $a$.

Figure 4:
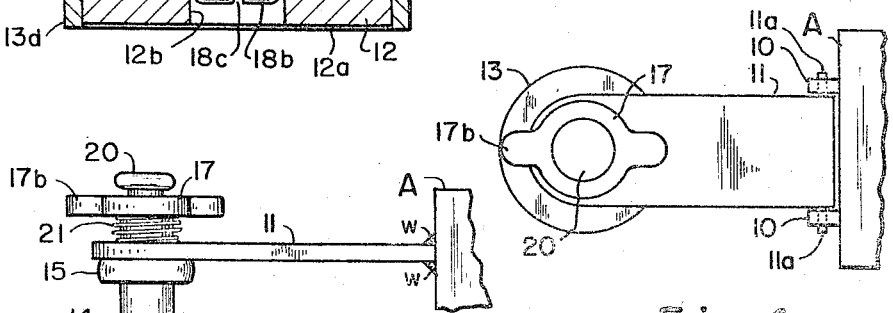
FIGURE 4 is a top plan view of the illustrated device on the scale of FIGURES 1 and 3 showing a modified form of mounting for its support arm.

In the illustrated embodiment of FIGURE 1, an outwardly-extending longitudinal support arm 11 is secured, as by weld metal $w$, to project from the housing A of the unit above the normal cutting-off position of the can B. In the embodiment of FIGURE 4, the arm 11, instead of being rigidly-secured, is pivotally-secured by a pair of spaced-apart mounting lugs or ears 10 which project from the housing A. A pair of edge-mounted oppositely-projecting pivot pins are carried by the inner end portion of the arm 11 and are rotatably-mounted to extend through or into holes in the lugs. 10. Positioning means is movably-carried by the support arm 11 to project downwardly therefrom and carry a magnet 12.

Figure 2:
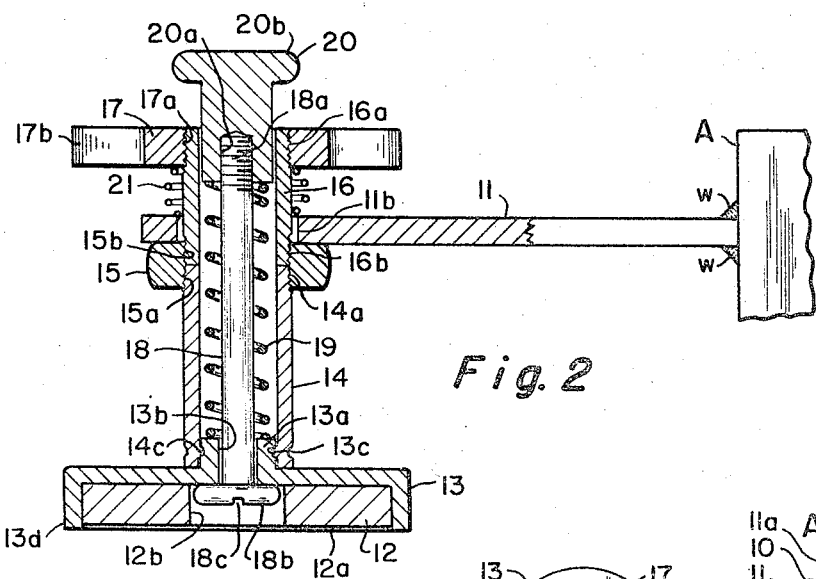
FIGURE 2 is an enlarged side view in section of the device of FIGURE 1 illustrating details of its construction.

Referring particularly to FIGURE 2, the support arm 11 at its extending or forward end, has an open portion or hole 11$b$ therethrough to bypass in a spaced clearance relationship, an upper sleeve part 16 whose outer periphery is slidably-positioned for loose movement within the open portion 11$b$. A magnet, such as permanent magnet 12, is shown of circular shaped and secured, as by cement, in position within a holder 13 having a concave cup or mounting portion. As illustrated particularly in FIGURE 2, the outer planar face 12$a$ of the magnet 12 is preferably slightly inwardly-offset from the edge face of an annular rim or flange portion 13$d$ of the holder 13, so as to provide a full direct abutment of the lid C with the edges 13$d$ when the lid is being magnetically-held in position, and to facilitate the release of the lid, as will be hereinafter explained.

The magnet 12 may be of any suitable shape, but has been shown for the purpose of illustration and simplicity, of circular shape; it is provided with a central bore or hole portion 12$b$ to bypass a release button or pushhead portion 18$b$ of a release pin or stem 18. The holder 13 has an upwardly-projecting boss or collar portion 13$a$ of an outer diameter substantially corresponding to the inner diameter of a lower, longer sleeve part 14, and may be permanently or securely connected thereto by upsetting localized portions of the wall of its lower end portion to form inwardly-projecting lugs 14c. In this connection, the boss 13a may, as shown, be provided with four recesses or slots 13c at spaced locations about its periphery to receive the lugs 14c. At its upper end, the lower sleeve 14 which extends vertically upwardly, is provided with so-called "slow" or fine threads 14a about its outer periphery to receive corresponding or complementary female threads 15a within a lower half of the bore of a mounting nut 15. The upper half of the threading of the bore represented by 15b of the nut 15 is complementary with male threading 16b about a lower end portion of the upper sleeve 16. The threading 15a and 15b may be of the same type, but is preferably of a different type. That is, for example, the threading 15a may be of a right-hand type and the threading 15b of a left-hand type, or vice versa, in order to facilitate the substantial equal division of the holding action of the nut 15 between the top end of the lower sleeve 14 and the lower end of the upper sleeve 16. In any event, the nut 15 serves to make the assembly of sleeves 14 and 16 of a demountable two-part construction and to provide a bottom limit abutment for restricting or limiting the maximum down position of the support arm 11 and thus, restricting the maximum upper position of the sleeve assembly 14 and 16 with respect to the arm 11.

A finger or hand grip or cap part 17 has an internally-threaded bore 17a for mounting it on male threading 16a about the upper end portion of the upper sleeve part 16. As shown particularly in FIGURES 2 and 4, the cap or grip part 17 is provided with a pair of oppositely-extending grip lugs 17b. An expanded compression spring 21 somewhat loosely surrounds the outer periphery of the upper sleeve part 16 and is shown as having widely spaced convolutions or spirals. The spring 21 has a slightly increased diameter adjacent the central or mid portion of its length so as to provide it with a somewhat soft, spring-like action. As shown particularly in FIGURES 1, 2 and 3, the spring 21, at its upper end, abuts the grip cap 17 and, at its lower end, abuts against the upper surface of the support arm 11, so as to normally urge the sleeve assembly 14, 16 to its upper position of FIGURE 2. This is a so-called "ready" position for a can-opening operation, in that the magnet 12 is at this time positioned in an above-spaced and non-holding position with respect to the lid C of the can B. However, the operator, by merely pressing-down on the grip cap 17 against the expansion force exerted by the spring 21, may move the magnet 12 into a holding position (such as illustrated in FIGURE 1) when a cutting or severing action is to be initiated.

The loose positioning of the sleeve assembly 14, 16 on the end of the arm 11 permits the magnet 12 to accommodate itself to any slope or other irregularity of the lid C to maintain a full magnetic holding action with respect thereto. The expansion force exerted by the spring 21 is so slight that it is only sufficient to normally hold the nut 15 in abutment with the lower side of the support arm 11, but is insufficient to offset the magnetic grip of the magnet 12 with respect to the lid C when the magnet has been moved downwardly with respect thereto (see FIGURE 1).

In order to effect a quick, simple and direct-releasing action on the lid C, after the cutting-off or opening operation has been accomplished, I provide vertically-extending release pin or stem 18 which at its lower end has a bottom abutment or relatively flat push-head portion 18b, and which at its upper end has male threads 18a to cooperatively-receive female threads 20a of a central bore in a push button 20. The push button 20 is shown provided with a rounded upper flange or head portion 20b, so that a thumb of the hand of an operator may be pressed downwardly on its upper planar surface while fingers of the hand are positioned below or under the grip cap 17. This relative downward movement causes the head 18b to move against expansion force exerted by a compression spring 19 from its retracted position within the bore 12b (as shown in FIGURE 2) to a downwardly-projecting, outer position (shown in FIGURE 3) that is sufficient to break the holding action of the magnet 12. This operation pushes the lid C sufficiently outwardly therefrom to thereby release it from the magnetic holding force of the magnet.

To facilitate mounting the release pin or stem 18 within the threaded bore of the push button 12, its head portion 18b is shown provided with a cross-extending screw driver-receiving slot 18c. The push button 20 and the push release head 18b of the pin or stem 18 are normally retained in the upper retracted position of FIGURE 2 by tension spring 19 which is loosely-positioned about and extends fully along the pin 18 to, at its upper end, abut the push button and, at its lower end, abut an upper edge of the boss portion 13a of the holder cup 13. It will be noted that the push button 20 has a cylindrical lower portion of reduced diameter which is adapted to slidably-fit within the upper end portion of the bore of the upper sleeve 16, and that the two-part sleeve assembly 14, 16 carries the pin 18 and the spring 21 operatively therein to thus provide a fully enclosed protective housing therefor. The sleeve assembly 14, 16 and the spring 21 serve as a lid lifter to raise the lid C upwardly away from the can B when the lid is fully cut away and before the holding action of the magnet 12 has been released.

The embodiment of FIGURE 4 provides for flexibility as to the lid manipulating device, in the sense that it permits the arm 11 and the means supported thereby to be swung downwardly or upwardly, as may be desired, for cleaning purposes, for shipping purposes, and for compacting the unit in a minimum of space, as when it is to be place in a cupboard.

Figures 3, 5:
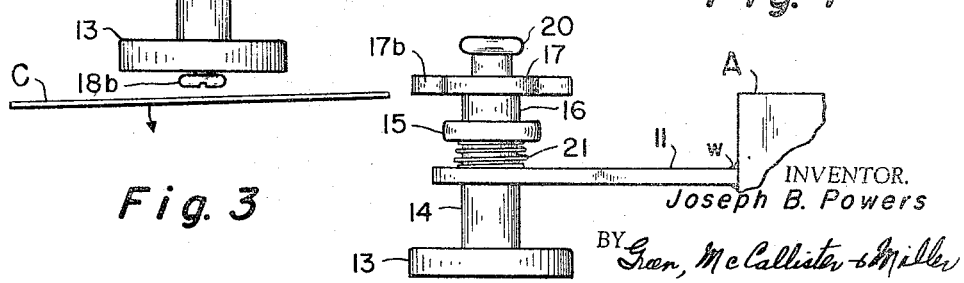
FIGURE 3 is a side view in elevation on the scale of FIGURE 1 showing the illustrated device in a releasing position for a cut-off or severed lid.
FIGURE 5 is a side view in elevation on the scale of FIGURES 1, 3 and 4 showing a modification of the construction of FIGURE 1.

In FIGURE 5, I have shown the spiral, expansion face exerting spring 21 positioned between the support arm 11 and the nut 15, instead of between the arm 11 and the grip cap 17. The device will function in the same manner as described in connection with the embodiment of FIGURES 1 to 4, inclusive, but the arrangement gives more free space for the manual gripping of the cap 17, and permits the arm 11 to be moved along substantially the full length of the lower sleeve 14. As a result, the arrangement of FIGURE 5 is particularly suitable for removing the lids of containers B of a greater range of heights. Although I have shown the magnet 12 as fixedly mounted with respect to the sleeve 14, it will be apparent that it can be pivotally mounted with respect thereto. Also, the sleeve 14 may be secured to the cup 13 by spaced lugs or wings extending from its end and twisted within aligned spaced slots in a centrally-upwardly offset portion of the top wall of the cup 13.

Although for purposes of illustration, I have shown a particular application of a device of my invention and have illustrated a preferred construction of its details, it will be apparent to those skilled in the art that various modifications and changes may be made without departing from its spirit and scope as indicated in the appended claims.

What I claim is:

1. A lid manipulating device for a can opener which comprises, a support arm, a magnet for holding the lid of a can to be opened, positioning means carried by said support arm and projecting downwardly therefrom for carrying said magnet, said positioning means being movable with respect to said support arm toward the lid of the can to move said magnet into a holding position with respect to the lid, and means operatively positioned within and along said positioning means for relative movement with respect to the magnet into engagement with the lid for releasing the lid from the holding action of said magnet.

2. A device as defined in claim 1 wherein said positioning means for said magnet comprises, a cup-shaped holder within which said magnet is secured, sleeve means connected at one end to support said holder, and means cooperating with said sleeve means and said support arm for movably-suspending said sleeve means from said support arm and spring means carried by said sleeve means and cooperating with said releasing means to normally retain said releasing means in a withdrawn position with respect to said magnet.

3. A device as defined in claim 1 wherein said positioning means for said magnet comprises, a downwardly projecting holder within which said magnet is secured, sleeve means connected at its lower end to said holder and projecting upwardly through said support arm, means cooperating with the upper end of said sleeve means and with said support means for normally holding said sleeve means in an upper position with respect to and on said support arm, said last mentioned means including a nut secured on said sleeve means below said support arm, a grip part on the upper end of said sleeve means, spring means positioned between said support arm and said grip part, a nut secured on said sleeve means above said support arm, and spring means positioned between said support arm and said nut.

4. A lid manipulating device for a can opener that is adapted to sever a lid of a can which comprises, a support arm, a magnet for holding the lid of the can to be opened during the severing operation, said support arm having an open portion therethrough, a two-part stem loosely-positioned to extend substantially vertically-downwardly through the open portion of said support arm, a nut securing the parts of said stem together at a location beneath said support arm in such a manner as to limit upward movement of said stem with respect to said support arm, a cup-shaped holder within which said magnet is secured, means securing said holder to a lower end portion of said two-part sleeve to project downwardly therefrom, a grip element secured on an upper end portion of said two-part stem, a spring positioned about said two-part stem between said grip element and said support arm for normally maintaining said two-part stem in an upward position in which said nut is in engagement with said support arm, said magnet having a central bore hole therethrough, an operating stem extending along said two-part sleeve and slidably-positioned by said holder for vertical movement within said two-part sleeve, said operating stem having a push-head at its lower end normally positioned within the central bore of said magnet in abutment with said holder, a push button secured to an upper end portion of said stem and slidably-mounted for up and down movement within the upper end portion of said two-part sleeve, a spring positioned within said two-part stem to at its upper end engage said push button and at its lower end engage said holder for normally retaining said stem in its upper position wherein said push-head is within the central bore of said magnet, and said push button being constructed to be moved downwardly with respect to said grip element and within said two-part sleeve to compress said second mentioned spring and move said push-head out of and beyond the central bore of said magnet for engagement with a lid to release the lid from the holding action of said magnet when the lid has been severed by the can opener.

5. A lid manipulating device as defined in claim 4 wherein, said nut has right-hand threading along substantially a half portion of its bore and left-hand threading along the other portion of its bore, and the parts of said two-part sleeve have threaded ends, one of which is a right-hand thread to screw into the right-hand threading of said nut and the other of which has a left-hand thread to screw into the left-hand threading of said nut.

6. A lid manipulating device for a can opener which comprises, a support arm, a magnet for holding the lid of a can to be opened, positioning means carried by said support arm and projecting downwardly therefrom for carrying said magnet, said positioning means being movable with respect to said support arm towards the lid of the can to move said magnet into a holding position with respect to the lid, means operatively-associated with said positioning means for relative movement with respect to the magnet into engagement with the lid for releasing the lid from the holding action of said magnet, said magnet having an open portion therethrough; and said lid releasing means comprising, stem means extending along said positioning means and into the open portion of said magnet, a push button connected with said stem means, means for moving said stem means outwardly through the open portion of said magnet to engage the lid and push it away from said magnet, and resilient means normally retaining said stem means in a withdrawn position within the open portion of said magnet.

7. A lid manipulating device for a can opener which comprises, a support arm, a magnet for holding the lid of a can to be opened, positioning means carried by said support arm and projecting downwardly therefrom for carrying said magnet, said positioning means being movable with respect to said support arm toward the lid of the can to move said magnet into a holding position with respect to the lid, means operatively-associated with said positioning means for relative movement with respect to the magnet into engagement with the lid for releasing the lid from the holding action of said magnet; said positioning means for said magnet comprising, a downwardly projecting holder within which said magnet is secured, sleeve means connected at its lower end to said holder and projecting upwardly through said support arm, and means cooperating with said sleeve means and with said support means for normally holding said sleeve means in an upper position with respect to and on said support arm; said magnet having an open portion centrally therethrough; and said lid releasing means comprising, stem means extending along said sleeve means and upwardly beyond the upper end portion thereof and at its lower end into the open portion of said magnet, push means secured on the upper extending end portion of said stem means and having a portion slidably-positioned within said sleeve means, and spring means extending along said sleeve means and thereabout to normally retain the lower end of said stem means within the open portion of said magnet; said push means being constructed and arranged to be moved downwardly-inwardly with respect to said sleeve means against force exerted by said spring means to move the lower end of said stem means downwardly out of and beyond the open portion of said magnet into engagement with the lid to release the holding action of said magnet with respect thereto.

8. In a can opener having a lid manipulating device, a support arm secured to the can opener and extending therefrom, a stem-like lid holder movably-carried by an outer end portion of said support arm and constructed for relative upward and downward movement with respect thereto, and said lid holder comprising: sleeve means extending vertically therealong, lid gripping magnet means mounted on a lower end of said sleeve means, a release pin operatively-carried within said sleeve means and having first means at its lower end for releasing the lid of a can from said lid gripping magnet means wherein said first means is a push head adapted to engage the lid and move it downwardly away from said magnet, said release pin having a second means at its upper end for moving it and said first means into a lid releasing position, and a third means carried by said sleeve means for normally urging said release pin and said first means out of a lid releasing position.

9. In a can opener device as defined in claim 8 wherein, said magnet means has an open portion therethrough, and said push head is carried by said sleeve means for in and out movement within said open portion.

10. In a can opener device as defined in claim 9 wherein, said sleeve means has a downwardly-open holder flange at its lower end positioned about said magnet means, and a lower edge of said flange is of slightly greater downward extent than the lower face of said magnet means to engage the lid and provide a slight clearance between said magnet means and the lid for facilitating release of the lid from said magnet means.

References Cited by the Examiner

UNITED STATES PATENTS

| | | | |
|---|---|---|---|
| 1,262,994 | 4/1918 | Stokes et al. | 30—6.4 |
| 2,554,628 | 5/1951 | Mesik | 30—6.4 |
| 2,897,589 | 8/1959 | Bodle | 30—4 |
| 2,903,927 | 9/1959 | Talge et al. | 30—8.5 X |
| 2,963,629 | 12/1960 | Rhodes | 30—6.4 |
| 3,079,683 | 3/1963 | Carew et al. | 30—4 |

WILLIAM FELDMAN, *Primary Examiner.*

G. WEIDENFELD, *Examiner.*